US012577406B2

(12) United States Patent
Kobayashi et al.

(10) Patent No.: US 12,577,406 B2
(45) Date of Patent: Mar. 17, 2026

(54) RESIN COMPOSITION, FILM, AND MULTILAYER STRUCTURE

(71) Applicant: Mitsubishi Chemical Corporation, Tokyo (JP)

(72) Inventors: Ryohei Kobayashi, Tokyo (JP); Tomoyuki Yamamoto, Tokyo (JP); Takuya Nakajima, Tokyo (JP); Keisuke Takeshita, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 605 days.

(21) Appl. No.: 17/475,708

(22) Filed: Sep. 15, 2021

(65) Prior Publication Data

US 2022/0002509 A1     Jan. 6, 2022

Related U.S. Application Data

(63) Continuation of application No. PCT/JP2020/014349, filed on Mar. 27, 2020.

(30) Foreign Application Priority Data

| | | |
|---|---|---|
| Mar. 29, 2019 | (JP) | 2019-067446 |
| Mar. 29, 2019 | (JP) | 2019-067447 |
| Oct. 30, 2019 | (JP) | 2019-197103 |
| Nov. 29, 2019 | (JP) | 2019-216942 |
| Dec. 27, 2019 | (JP) | 2019-237755 |
| Dec. 27, 2019 | (JP) | 2019-237756 |

(51) Int. Cl.

| | |
|---|---|
| C09D 5/00 | (2006.01) |
| C08F 16/06 | (2006.01) |
| C08J 5/18 | (2006.01) |
| C08K 5/098 | (2006.01) |
| C09D 7/63 | (2018.01) |
| C09D 101/28 | (2006.01) |
| C09D 129/04 | (2006.01) |

(52) U.S. Cl.
CPC .............. C09D 5/00 (2013.01); C08F 16/06 (2013.01); C08J 5/18 (2013.01); C09D 7/63 (2018.01); C09D 101/28 (2013.01); C09D 129/04 (2013.01); C08J 2329/04 (2013.01); C08K 5/098 (2013.01)

(58) Field of Classification Search
None
See application file for complete search history.

(56) References Cited

U.S. PATENT DOCUMENTS

| | | |
|---|---|---|
| 9,376,545 B2 | 6/2016 | Okamoto et al. |
| 2003/0157283 A1 | 8/2003 | Tai et al. |
| 2004/0253463 A1 | 12/2004 | Inui et al. |
| 2005/0131162 A1 | 6/2005 | Tanaka et al. |

| | | | |
|---|---|---|---|
| 2006/0009561 A1 | 1/2006 | Kamoshita et al. | |
| 2011/0130280 A1 | 6/2011 | Tsuchimura et al. | |
| 2011/0135950 A1 | 6/2011 | Okamoto et al. | |
| 2011/0262731 A1 | 10/2011 | Mukai et al. | |
| 2012/0128961 A1* | 5/2012 | Yoshida | B32B 27/306 |
| | | | 428/521 |
| 2014/0206798 A1 | 7/2014 | Oomori et al. | |
| 2014/0363661 A1 | 12/2014 | Kaminaga et al. | |
| 2018/0015707 A1 | 1/2018 | Kani | |
| 2018/0291177 A1 | 10/2018 | Komuro | |
| 2018/0355146 A1 | 12/2018 | Nakashima et al. | |
| 2019/0283382 A1 | 9/2019 | Murase et al. | |

FOREIGN PATENT DOCUMENTS

| | | |
|---|---|---|
| CN | 1685024 A | 10/2005 |
| CN | 103842452 A | 6/2014 |
| CN | 104136219 A | 11/2014 |
| CN | 107532005 A | 1/2018 |
| CN | 108473743 A | 8/2018 |
| EP | 3 434 734 A1 | 1/2019 |
| JP | 2001-106920 A | 4/2001 |
| JP | 2001-226553 A | 8/2001 |
| JP | 2002-275214 A | 9/2002 |
| JP | 2002-338821 A | 11/2002 |
| JP | 2003-53909 A | 2/2003 |

(Continued)

OTHER PUBLICATIONS

Tironi et al. (Procedia Materials Science 1 ( 2012 ) 343-350) (Year: 2012).*

Souza et al. Applied Clay Science 54 (2011) 226-234 (Year: 2011).*

Daniel Gutiérrez-Martín et al. Appl. Sci. 2022, 12, 6786 (Year: 2022).*

Decision of Refusal issued in corresponding Chinese Patent Application No. 202080020720.8 dated Feb. 24, 2023, along with English translation thereof.

Search Report issued in European Patent Application No. 20785005.8, Mar. 29, 2022.

(Continued)

*Primary Examiner* — Robert T Butcher

(74) *Attorney, Agent, or Firm* — Greenblum & Bernstein, P.L.C.

(57) ABSTRACT

A resin composition contains a hydrophilic resin and a metal compound, and has an X-ray diffraction peak at $2\theta=2$ to $15°$ in an X-ray diffraction pattern as measured by wide angle X-ray diffraction using CuKα radiation, and a resin composition contains a hydrophilic resin and a metal compound, wherein the metal compound satisfies the following general formula (1):

$$M_a(OH)_b A^{n-}{}_{(2a-b)/n} \tag{1}$$

wherein M is a metal species, A is an anionic ligand having a valence of n- and excluding a hydroxy ligand and O (oxo ligand), n is an integer not less than 1, and a and b are numbers greater than zero and satisfy an expression $a/b=0.1$ to 10. The resin composition exhibits excellent gas barrier property in a high humidity environment, particularly in oxygen barrier property in the high humidity environment.

7 Claims, No Drawings

(56)     References Cited

FOREIGN PATENT DOCUMENTS

| JP | 2003-128804 A | 5/2003 |
| JP | 2003-165945 A | 6/2003 |
| JP | 2003-301055 A | 10/2003 |
| JP | 2006-52305 A | 2/2006 |
| JP | 2006-514077 A | 4/2006 |
| JP | 2006-219518 A | 8/2006 |
| JP | 2007-313758 A | 12/2007 |
| JP | 2008-105273 A | 5/2008 |
| JP | 2010-013618 A | 1/2010 |
| JP | 2010-202855 A | 9/2010 |
| JP | 2011-136557 A | 7/2011 |
| JP | 2016-121335 A | 7/2016 |
| JP | 2016-221864 A | 12/2016 |
| JP | 2017-052567 A | 3/2017 |
| JP | 2017-088666 A | 5/2017 |
| JP | 2018-089567 A | 6/2018 |
| JP | 2018-114751 A | 7/2018 |
| JP | 2018-154714 A | 10/2018 |
| WO | 03/091317 A1 | 11/2003 |
| WO | 2004/064867 A1 | 8/2004 |
| WO | 2009/084191 A1 | 7/2009 |
| WO | 2010/016595 A1 | 2/2010 |
| WO | 2013/042654 A1 | 3/2013 |
| WO | 2013/129515 A1 | 9/2013 |
| WO | 2017/110844 A1 | 6/2017 |
| WO | 2017/175775 A | 10/2017 |

OTHER PUBLICATIONS

Office Action issued in Chinese Patent Application No. 202080020720.8, Apr. 25, 2022, English translation.

"Synthesis of Layered Double Hydroxide Single-Layer Nanosheets in Formamide", Jingfang Yu et al., Inorganic Chemistry, pp. 12036-12041, 2016.

"Transparent, Ultrahigh-Gas-Barrier Films with a Brick-Mortar-Sand Structure", Yibo Dou et al., Angewandte Chemie, pp. 9673-9678, 2015.

Office Action issued in Chinese Patent Application No. 202080020720.8, Nov. 4, 2022, translation.

ISR issued in WIPO Patent Application No. PCT/JP2020/014349, Jun. 16, 2020, English translation.

IPRP issued in WIPO Patent Application No. PCT/JP2020/014349, Sep. 28, 2021, English translation.

Office Action that issued in corresponding European Patent Application No. 20785005.8, dated Dec. 4, 2023.

Office Action that issued in corresponding Japanese Patent Application No. 2020-058972 dated Dec. 5, 2023, along with its English translation.

Office Action that issued in corresponding Japanese Patent Application No. 2020-058973 dated Dec. 5, 2023, along with its English translation.

Office Action issued Mar. 18, 2025 in Japanese patent application No. 2020-178864, with English machine translation thereof.

"Research on migration behavior of cations in buffers in the coexistence system," *Akiyama Daisuke*, corrosion products, Research on the Doctoral University, 2014, pp. 1-108.

Kenji et al., "The properties evaluation—diffusion models of water and ions in the montmorillonite layer by the Molecular dynamics method," *Clay Science*, vol. 58, No. 1, 2019, pp. 8-25.

Decision of Refusal dated Dec. 17, 2024, issued in Japanese patent application No. 2020-217876, with English translation thereof.

Office Action that issued in the corresponding Japanese Patent Application No. 2020-058972, dated Jun. 25, 2024, along with its English translation.

Office Action that issued in the corresponding Japanese Patent Application No. 2020-058973, dated Jun. 25, 2024, along with its English translation.

Office Action that issued in the corresponding Japanese Patent Application No. 2020-217875, dated Jul. 9, 2024, along with its English translation.

Office Action that issued in the corresponding Japanese Patent Application No. 2020-217876, dated Jul. 9, 2024, along with its English translation.

Decision of Refusal issued Jan. 28, 2025 in Japanese patent application No. 2020-217875, with English machine translation thereof.

Office Action mailed Oct. 22, 2024 in Japanese Patent Application No. 2020-195847, with English machine translation.

Office Action mailed Oct. 22, 2024 in Japanese Patent Application No. 2020-178864, with English machine translation.

Office Action dated Oct. 29, 2025, issued in European patent application No. 20785005.8.

* cited by examiner

RESIN COMPOSITION, FILM, AND MULTILAYER STRUCTURE

RELATED APPLICATION

This application is a continuation of International Application No. PCT/JP2020/014349, filed on Mar. 27, 2020, which claims priority to Japanese Patent Application Nos. 2019-067446 and 2019-067447, filed on Mar. 29, 2019, 2019-197103, filed on Oct. 30, 2019, 2019-216942, filed on Nov. 29, 2019, and 2019-237755 and 2019-237756, filed on Dec. 27, 2019, the entire contents of each of which being hereby incorporated by reference.

TECHNICAL FIELD

The present disclosure relates to a resin composition and, more specifically, to a resin composition which can be used for formation of a film having a higher gas barrier property in a high humidity environment.

BACKGROUND ART

Hydrophilic resins such as polyvinyl alcohol resins are generally excellent in strength, transparency, and gas barrier property. Therefore, the hydrophilic resins are formed into films, which are widely used for various packaging materials, particularly, for foods, chemical agents, and the like that need to be protected from degradation due to oxygen.

However, the hydrophilic resins have a greater number of hydroxyl groups and, hence, are liable to be significantly affected by humidity. Therefore, the hydrophilic resins are liable to suffer from significant deterioration in gas barrier property in a high humidity environment.

PTL 1, for example, discloses a gas barrier film material for a film having an improved gas barrier property. The gas barrier film material contains poorly-water-soluble inorganic particles having an average particle diameter of not greater than 500 nm, and a water-soluble or water-dispersible polymer compound, wherein the poorly-water-soluble particles are ionic crystal particles prepared by a reaction of an inorganic compound essentially containing at least one selected from the group consisting of aluminum, silicon, zinc, zirconium, silver, and tin, or any of their salts with at least one compound selected from the group consisting of an organic acid, an inorganic acid, and their salts.

PTL 2 discloses a gas barrier layer formation composition, which contains a water-soluble polymer, at least one selected from the group consisting of a metal alkoxide, a hydrolysis product of the metal alkoxide, and tin chloride, and a compound represented by a general formula ($R^1$Si $(OR^2)_3)_n$ (wherein $R^1$ is an organic functional group, $R^2$ is $CH_3$, $C_2H_5$ or $C_2H_4OCH_3$).

Further, PTL 3 discloses a gas barrier laminate production method, which includes the steps of forming a coating film containing zinc ions, at least one selected from a metal alkoxide and its hydrolysis product, and a water-soluble polymer on a surface of a substrate film or a laminate including the substrate film; and drying the coating film to form a gas barrier layer on the surface.

RELATED ART DOCUMENT

Patent Document

PTL 1: JP-A-2002-338821
PTL 2: JP-A-2016-221864
PTL 3: JP-A-2018-089567

SUMMARY

However, the gas barrier films disclosed in PTL 1 to PTL 3 each have an insufficient gas barrier property in the high humidity environment, requiring further improvement.

In view of the foregoing, the present disclosure provides a resin composition which is excellent in gas barrier property in the high humidity environment, particularly, excellent in oxygen barrier property in the high humidity environment.

The inventors of the present disclosure found that, where a resin composition containing a hydrophilic resin further contains a metal compound and has an X-ray diffraction peak at $2\theta=2$ to $15°$ in an X-ray diffraction pattern as measured by wide angle X-ray diffraction using CuKα radiation, the resin composition is excellent in gas barrier property in the high humidity environment.

Further, the inventors found that, where a resin composition containing a hydrophilic resin further contains a metal compound, and the metal compound satisfies the following general formula (1), the resin composition is excellent in gas barrier property in the high humidity environment.

$$M_a(OH)_bA^{n-}{}_{(2a-b)/n} \tag{1}$$

wherein M is a metal species, A is an anionic ligand having a valence of n- and excluding a hydroxy ligand and O (oxo ligand), n is an integer not less than 1, and a and b are numbers greater than zero and satisfy an expression $a/b=0.1$ to 10.

According to a first aspect of the present disclosure, a resin composition is provided, which contains a hydrophilic resin and a metal compound, and has an X-ray diffraction peak at $2\theta=2$ to $15°$ in an X-ray diffraction pattern as measured by wide angle X-ray diffraction using CuKα radiation.

According to a second aspect of the present disclosure, a resin composition is provided, which contains a hydrophilic resin and a metal compound, wherein the metal compound satisfies the following general formula (1):

$$M_a(OH)_bA^{n-}{}_{(2a-b)/n} \tag{1}$$

wherein M is a metal species, A is an anionic ligand having a valence of n- and excluding a hydroxy ligand and O (oxo ligand), n is an integer not less than 1, and a and b are numbers greater than zero and satisfy an expression $a/b=0.1$ to 10.

According to a third aspect of the present disclosure, a film is provided, which comprises the resin composition according to the first aspect or the resin composition according to the second aspect. According to a fourth aspect of the present disclosure, a multilayer structure is provided, which includes at least one layer formed of the film according to the third aspect.

The resin composition of the first aspect contains the hydrophilic resin and the metal compound, and has an X-ray diffraction peak at $2\theta=2$ to $15°$ in an X-ray diffraction pattern as measured by the wide angle X-ray diffraction using CuKα radiation. Therefore, the film comprising the resin composition is excellent in gas barrier property, particularly in oxygen barrier property, in the high humidity environment.

The resin composition of the second aspect contains the hydrophilic resin and the metal compound, and the metal compound satisfies the above general formula (1). Where molecules of the hydrophilic resin and water molecules are present around the metal compound satisfying the above general formula (1), layers of the metal compound are separated from each other to form a minute lamellar structural unit, which interacts with the hydrophilic resin in a molecular level. As a result, the film comprising the resin composition is excellent in gas barrier property, particularly in oxygen barrier property, in the high humidity environment.

DESCRIPTION OF EMBODIMENTS

Embodiments of the present disclosure will hereinafter be described specifically. However, it should be understood that the disclosure be not limited to these embodiments.

A resin composition according to one embodiment of the present disclosure contains a hydrophilic resin and a metal compound, and has an X-ray diffraction peak at $2\theta=2$ to $15°$ in an X-ray diffraction pattern as measured by the wide angle X-ray diffraction using CuK$\alpha$ radiation.

A resin composition according to another embodiment of the present disclosure contains a hydrophilic resin and a metal compound, wherein the metal compound satisfies the following general formula (1):

$$M_a(OH)_b A^{n-}{}_{(2a-b)/n} \tag{1}$$

wherein M is a metal species, A is an anionic ligand having a valence of n- and excluding a hydroxy ligand and O (oxo ligand), n is an integer not less than 1, and a and b are numbers greater than zero and satisfy an expression a/b=0.1 to 10.

The components of the resin compositions will hereinafter be described.

[Hydrophilic Resin]

Specific examples of the hydrophilic resin include water-soluble resins such as vinyl alcohol resin, polysaccharide, acrylic resin, and polyether resin. These hydrophilic resins may be used alone or in combination.

The hydrophilic resin preferably has the following properties when being formed into a film.

Where the film is formed from the hydrophilic resin as having a thickness of 30 μm and immersed still in water at 25° C. for two hours, the film preferably has an area change ratio of not less than 105%. The area change ratio may be calculated from the following expression:

$$\text{Area change ratio (\%)} = \frac{\text{Film area after immersion}}{\text{Film area before immersion}} \times 100$$

The specific examples of the hydrophilic resin will hereinafter be described in detail.

[Vinyl Alcohol Resin]

Resins known as ethylene-vinyl alcohol copolymer resins (having an ethylene content of 20 to 60 mol %) are generally excluded as the vinyl alcohol resin. A typical example of the vinyl alcohol resin is polyvinyl alcohol (hereinafter referred to as "PVA") resin.

In general, the PVA resin is preferably an unmodified PVA resin, but may be a modified PVA resin.

The unmodified PVA resin can be typically prepared by polymerizing a vinyl ester monomer, and then saponifying the resulting polymer.

The modified PVA resin can be prepared by saponifying a polymer of the vinyl ester monomer and some other unsaturated monomer, or by post-modifying the unmodified PVA resin.

Examples of the vinyl ester monomer include aliphatic vinyl esters such as vinyl formate, vinyl acetate, vinyl propionate, vinyl valerate, vinyl butyrate, vinyl isobutyrate, vinyl pivalate, vinyl caprate, vinyl laurate, vinyl stearate, vinyl versatate, and vinyl trifluoroacetate, and aromatic vinyl esters such as vinyl benzoate. The aliphatic vinyl esters preferably have a carbon number of 3 to 20, more preferably 4 to 10, particularly preferably 4 to 7. Vinyl acetate is especially preferred. These vinyl esters are typically each used alone or, as required, a plurality of vinyl esters may be selected from these vinyl esters to be used in combination.

Examples of the other unsaturated monomer include: olefins such as ethylene, propylene, isobutylene, α-octene, α-dodecene, and α-octadecene; unsaturated acids such as acrylic acid, methacrylic acid, crotonic acid, maleic acid, maleic anhydride, and itaconic acid, salts of these unsaturated acids, and monoalkyl and dialkyl esters of these unsaturated acids; nitriles such as acrylonitrile and methacrylonitrile; amides such as acrylamide and methacrylamide; olefin sulfonic acids such as ethylenesulfonic acid, allylsulfonic acid, and methallylsulfonic acid, and salts of these olefin sulfonic acids; alkyl vinyl ethers; N-acrylamide methyl trimethylammonium chloride, allyl trimethylammonium chloride, dimethylallyl vinyl ketone, N-vinylpyrrolidone, vinyl chloride, and vinylidene chloride; polyoxyalkylene (meth)allyl ethers such as polyoxyethylene (meth)allyl ether, and polyoxypropylene (meth)allyl ether; polyoxyalkylene (meth)acrylates such as polyoxyethylene (meth)acrylate and polyoxypropylene (meth)acrylate; polyoxyalkylene (meth)acrylamides such as polyoxyethylene (meth)acrylamide and polyoxypropylene (meth)acrylamide; polyoxyethylene (1-(meth)acrylamide-1,1-dimethylpropyl) ester, polyoxyethylene vinyl ether, and polyoxypropylene vinyl ether; and polyoxyethylene allylamine, polyoxypropylene allylamine, polyoxyethylene vinylamine, and polyoxypropylene vinylamine. These may be used alone or in combination. The term "(meth)allyl" means allyl or methallyl, and the term "(meth)acrylate" means acrylate or methacrylate. The term "(meth)acryl" means acryl or methacryl.

The PVA resin may be prepared by a known polymerization method, a known saponification method, and a known post-modification method.

The amount of the other unsaturated monomer to be introduced and the modification degree for the post modification are properly determined according to the type of the monomer, and are each typically not greater than 15 mol %, particularly not greater than 10 mol %. If the introduced amount and the modification degree are excessively great, the PVA resin tends to have a reduced crystallinity, thereby reducing the gas barrier property of a film formed from the resin composition.

The PVA resin typically has an average saponification degree of 70 to 100 mol %, preferably 80 to 100 mol %, particularly preferably 85 to 100 mol %, more preferably 90 to 99.99 mol %. If the average saponification degree is lower than 70 mol %, the oxygen permeability tends to be increased in the high humidity environment. The average saponification degree is measured in conformity with JIS K6726.

The PVA resin typically has an average polymerization degree of 100 to 4,000, preferably 200 to 3,000, particularly preferably 250 to 2,500. If the average polymerization degree is excessively low, mechanical properties such as film strength tend to be poorer. If the average polymerization degree is excessively high, it will be difficult to solubilize the PVA resin in water and hence to handle the PVA resin. The average polymerization degree is measured in conformity with JIS K6726.

Two or more PVA resins which are different in modification species, modification degree, average saponification degree, and average polymerization degree may be used in combination as the PVA resin.

[Polysaccharide]

Examples of the polysaccharide include starch, and cellulose.

Examples of the starch include natural starches such as corn starch and potato starch, and modified starches such as etherified starch, esterified starch, crosslinked starch, grafted starch, baked dextrin, enzyme-modified dextrin, gelatinized starch, and oxidized starch.

Examples of the cellulose include carboxymethyl cellulose, methyl cellulose, ethyl cellulose, hydroxymethyl cellulose, hydroxypropylmethyl cellulose, hydroxyethyl cellulose, hydroxyethylmethyl cellulose, hydroxypropyl cellulose, nitrocellulose, and cationic cellulose, and metal salts such as sodium salts of these celluloses.

[Acrylic Resin]

Examples of the acrylic resin include polyacrylamide and polyacrylic acid, and metal salts such as sodium salts of the polyacrylic acid.

[Polyether Resin]

Examples of the polyether resin include polyethylene glycol and polypropylene glycol.

Of the aforementioned hydrophilic resins, the vinyl alcohol resin and the polysaccharide are preferred, and the PVA resin, the modified starch (particularly the soluble starch), and hydroxypropylmethyl cellulose are more preferred. The unmodified PVA resin is most preferred.

The hydrophilic resin is preferably a main component of the resin composition of the present disclosure, and the proportion of the hydrophilic resin is typically not less than 80 wt. %, preferably not less than 90 wt. %, particularly preferably not less than 95 wt. %, based on the overall amount of the resin composition. The upper limit of the proportion of the hydrophilic resin is typically 99.99 wt. %.

Particularly, the PVA resin is preferably the main component of the resin composition of the present disclosure, and the proportion of the PVA resin is typically not less than 80 wt. %, preferably not less than 90 wt. %, particularly preferably not less than 95 wt. %, based on the overall amount of the resin composition. The upper limit of the proportion of the PVA resin is typically 99.99 wt. %.

[Metal Compound]

The metal compound has a lamellar structure including layers of a specific structural unit spaced a specific interfacial distance from each other. For example, the metal compound has a lamellar structure including layers of a metal complex spaced a specific interfacial distance from each other.

Examples of the metal species of the metal compound include Na, K, Ca, Mg, Si, Al, Ti, Cr, Mn, Fe, Co, Ni, Cu, and Zn. These metal species may be contained alone or in combination. Particularly, Zn is preferred for an excellent gas barrier property, particularly for an excellent oxygen barrier property, in the high humidity environment.

The metal compound is prepared from a compound containing at least one metal selected from the group consisting of Na, K, Ca, Mg, Si, Al, Ti, Cr, Mn, Fe, Co, Ni, Cu, and Zn (hereinafter referred to as "metal-containing material compound") by the following method.

More specifically, the structural unit of the metal compound is a structural unit containing the metal, a hydroxy ligand, and an anionic ligand other than the hydroxy ligand, preferably a structural unit containing the metal, the hydroxy ligand, and the anionic ligand other than the hydroxy ligand and represented by the following chemical formula (1):

$$M_a(OH)_b A^{n-}{}_{(2a-b)/n} \tag{1}$$

wherein M is the metal species, A is the anionic ligand having a valence of n- and excluding the hydroxy ligand and O (oxo ligand) and, n is an integer not less than 1, and a and b are numbers greater than zero and satisfy an expression a/b=0.1 to 10.

In the above chemical formula (1), examples of the metal species M include Na, K, Ca, Mg, Si, Al, Ti, Cr, Mn, Fe, Co, Ni, Cu, and Zn, which may be used alone or in combination. For the excellent gas barrier property, particularly for the excellent oxygen barrier property, in the high humidity environment, Al, Si, Mg, Ni, Co, and Zn are preferred, and Ni, Co, and Zn are particularly preferred. Especially, Zn is preferred.

In the above chemical formula (1), examples of the anionic ligand A include RO (alkoxy ligand), ROCO (carboxylate ligand), $CO_3$, $NO_3$, $SO_3$, $PO_4$, $BO_3$, F, Br, and Cl (wherein R is an alkyl chain which is generally represented by a chemical formula $C_mH_{2m+1}$ (m=1 to 20) and may have a functional group such as OH group as long as the effects of the present disclosure are not impaired). However, O (oxo ligand) is excluded as the anionic ligand A. These anionic ligands may be contained alone or in combination. From the viewpoint of interaction between the metal compound and the hydrophilic resin, $NO_3$, Cl, RO, and ROCO are preferred, and ROCO is particularly preferred. Especially, $CH_3OCO$ is preferred.

The metal compound may contain a water molecule.

A specific example of the metal compound is a metal-containing lamellar compound such as containing Zn as the metal species. For the excellent gas barrier property, particularly for the excellent oxygen barrier property, in the high humidity environment, the layered basic zinc compound is preferred, and a layered basic zinc compound represented by a chemical formula $Zn_5(OH)_8(CH_3CO_2)_2 \cdot 2H_2O$ is more preferred.

The metal compound can be prepared, for example, through a reaction of the metal-containing material compound under specific conditions.

The metal-containing material compound may be, for example, an organic acid metal salt or an inorganic metal salt.

Examples of an organic acid moiety of the organic acid metal salt include monovalent carboxylic acids such as acetic acid, divalent carboxylic acids such as succinic acid, oxalic acid, and tartaric acid, and trivalent and higher-valent carboxylic acids such as citric acid and ethylenediaminetetraacetic acid, which may be used alone or in combination. The organic acid metal salt may be a hydrate or may be an anhydride.

For the excellent gas barrier property, particularly for the excellent oxygen barrier property, in the high humidity environment, metal salts of the monovalent carboxylic acids are preferred, and metal salts of acetic acid are particularly preferred as the organic acid metal salt. Especially, zinc acetate or its hydrate is preferred.

Examples of the inorganic metal salt include fluorides, chlorides, bromides, iodides, and oxo acid salts of the metals, which may be used alone or in combination. The inorganic metal salt may be a hydrate or may be an anhydride.

For the excellent gas barrier property, particularly for the excellent oxygen barrier property, in the high humidity environment, the chlorides and the oxo acid salts of the metals are preferred, and zinc chloride and zinc nitrate, and their hydrates are particularly preferred as the inorganic metal salt.

The metal compound can be prepared with the use of the metal-containing material compound, for example, by a method (I) in which the metal-containing material compound is allowed to react in the presence of a base, or a method (II) in which the metal-containing material compound is allowed to react by heating.

These methods will hereinafter be described in detail.

[Method (I)]

In the method (I), the metal-containing material compound is allowed to react in the presence of the base.

Examples of the base to be used in the method (I) include hydroxides of alkali metals and alkali earth metals. Of these, the alkali metal hydroxides are preferred because of their higher reactivity with the metal-containing material compound, and sodium hydroxide is particularly preferred.

The metal-containing material compound is typically mixed with the base in a solution thereof, and allowed to react with the base in the solution.

The method for mixing the metal-containing material compound with the base is not particularly limited, but examples of the method include a method in which a solution prepared by dissolving the metal-containing material compound in a solvent and a solution prepared by dissolving the base in a solvent are mixed together, and a method in which a slurry prepared by dispersing the metal-containing material compound in a solvent and a solution prepared by dissolving the base in a solvent are mixed together. Particularly, the method in which the solution of the metal-containing material compound and the solution of the base are mixed together is preferred from the viewpoint of reaction efficiency. Where the organic acid metal salt is used as the metal-containing material compound, a method in which a solution prepared by dissolving the organic acid metal salt in a solvent is added to and mixed with the solution of the base is preferred. Where the inorganic metal salt is used as the metal-containing material compound, a method in which the solution of the base is added to and mixed with a solution prepared by dissolving the inorganic metal salt in the solvent is preferred.

The solvents in which the metal-containing material compound and the base are dissolved are not particularly limited, as long as the metal-containing material compound and the base can be dissolved therein. Examples of the solvents include water, and C1 to C5 lower alcohols such as methanol, ethanol, 1-propanol, 2-propanol, 1-butanol, and 2-butanol, which may be used alone or in combination. Of these, water is preferred because it ensures easier post treatment.

The concentration of the metal-containing material compound in the solution prepared by dissolving the metal-containing material compound in the solvent is typically 0.5 to 3 mol/L, preferably 1 to 2 mol/L.

The concentration of the base in the solution prepared by dissolving the base in the solvent is typically 0.01 to 100 mol/L, preferably 0.1 to 30 mol/L, particularly preferably 1 to 10 mol/L. If the concentration of the metal-containing material compound and the concentration of the base are much lower than the aforementioned ranges, the reaction tends to insufficiently proceed. If the concentration of the metal-containing material compound and the concentration of the base are much higher than the aforementioned ranges, a side reaction tends to occur.

The molar ratio between the metal-containing material compound and the base ((metal-containing material compound):(base)) is typically 0.5:2 to 2:0.5, preferably 0.8:1.5 to 1.5:0.8, particularly preferably 0.9:1.2 to 1:1. If the molar ratio falls outside the aforementioned rages, the reaction tends to insufficiently proceed.

The reaction between the metal-containing material compound and the base is typically allowed to proceed at a pH of 4 to 9, preferably 5 to 8. If the pH is much lower than the aforementioned ranges, the reaction tends to insufficiently proceed. If the pH is much higher than the aforementioned ranges, the metal compound generated by the reaction tends to be decomposed. The pH is controlled by adjusting the amount of the solution of the metal-containing material compound and the amount of the solution of the base to be used.

The reaction is typically allowed to proceed at a temperature of 15° C. to 60° C., preferably 20° C. to 40° C. If the reaction temperature is excessively low, the reaction tends to insufficiently proceed. If the reaction temperature is excessively high, the metal-containing material compound tends to be thermally decomposed, making it impossible to provide the intended metal compound.

The reaction period is typically 0.5 to 5 hours, preferably 1 to 3 hours. The reaction pressure may be an ordinary pressure.

The metal compound prepared through the reaction is in the form of precipitate. The metal compound thus prepared may be used as it is, but is preferably refined by washing, grinding and/or the like before use.

[Method (II)]

In the method (II), the metal-containing material compound is allowed to react by heating.

In the method (II), a solution prepared by dissolving the metal-containing material compound in a solvent is heated while being stirred.

Examples of the solvent in which the metal-containing material compound is dissolved include those described above as the solvents to be used in the method (I). Particularly, water and the alcohols are preferred. A solvent mixture containing water and 1-propanol is particularly preferred.

For the reaction, the solution may be typically heated to a temperature of 20° C. to 100° C., preferably 50° C. to 95° C., particularly preferably 70° C. to 90° C. If the reaction temperature is excessively low, the reaction tends to insufficiently proceed. If the reaction temperature is excessively high, the metal-containing material compound tends to be thermally decomposed, making it impossible to provide the intended metal compound.

The reaction period is typically 0.1 to 100 hours, preferably 0.5 to 30 hours, particularly preferably 1 to 10 hours. The reaction pressure may be an ordinary pressure.

The metal compound prepared through the reaction is in the form of precipitate. The metal compound thus prepared may be used as it is, or may be refined by washing, grinding and/or the like before use.

The term "metal compound" generally means, for example, a metal salt, a metal oxide, a metal complex, a metal, an alloy or the like. In contrast, the metal compound prepared by any of the methods described above is the metal compound having the lamellar structure including the layers of the specific structural unit spaced the specific interfacial distance from each other. Where molecules of the hydrophilic resin and water molecules are present around the metal compound, therefore, the layers of the metal compound are separated from each other, and the resulting minute lamellar structural unit interacts with the hydrophilic resin on a molecular basis. This supposedly ensures the excellent gas barrier property, particularly the excellent oxygen barrier property.

For the excellent gas barrier property, particularly for the excellent oxygen barrier property, in the high humidity environment, the metal compound preferably has a major X-ray diffraction peak at $2\theta = 2$ to $15°$, preferably $2\theta = 2$ to $9°$, particularly preferably $2\theta = 3$ to $8°$, in an X-ray diffraction pattern as measured by the wide angle X-ray diffraction using CuKα radiation. Where the metal compound has the major X-ray diffraction peak in the aforementioned $2\theta$ angle range, the metal compound and the hydrophilic resin interact with each other, so that the polarity of the hydrophilic resin is increase. This ensures the excellent gas barrier property, particularly the excellent oxygen barrier property, in the high humidity environment.

The interlayer distance (the distance between the layers) of the metal compound is preferably 0.01 to 50 nm, more preferably 0.1 to 30 nm, to ensure proper interaction between the hydrophilic resin molecules and the water molecules. The interlayer distance of the metal compound can be calculated from the Bragg's equation based on the diffraction position of a highest-intensity peak in the range of $2\theta = 2$ to $15°$ as analyzed by the X-ray diffraction.

The lamellar structural unit of the separated layers of the metal compound preferably has a molecular weight of 100 to 10,000, particularly preferably 200 to 2,000, to ensure the proper interaction with the hydrophilic resin molecules.

The lamellar structural unit is preferably hydrophilic to ensure the proper interaction with the hydrophilic resin molecules.

It is preferred that the lamellar structural unit is not decomposed even if being allowed to stand still in an environment at 20° C. at 90% RH for 1,000 hours.

The amount of the metal compound contained in the resin composition of the present disclosure on a metal basis based on the amount of the resin composition is typically 0.01 to 20 wt. %, preferably 0.01 to 10 wt. %, more preferably 0.1 to 8 wt. %, particularly preferably 0.2 to 4 wt. %.

The amount of the metal compound contained in the resin composition of the present disclosure on a metal basis based on 100 parts by weight of the hydrophilic resin is typically 0.01 to 20 wt. %, preferably 0.01 to 10 wt. %, more preferably 0.1 to 8 wt. %, particularly preferably 0.2 to 4 wt. %. If the amount of the metal compound is excessively small, the oxygen barrier property in the high humidity environment tends to be poorer. If the amount of the metal compound is excessively high, the resin composition tends to be whitened to have a lower transparency when being formed into a film.

Where the resin composition contains a plurality of metal compounds having different metal species, the amount of the metal compound is defined as the total amount of the metal compounds contained in the resin composition.

The amount of the metal compound can be determined by a standard addition method using ICP-MS.

[Other Ingredients]

Additives to be generally blended in resin compositions may be added to the resin composition of the present disclosure, as long as the effects of the present disclosure are not impaired. Examples of the additives include heat stabilizer, antioxidant, antistatic agent, colorant, UV absorber, lubricant, plasticizer, light stabilizer, surfactant, antibacterial agent, desiccant, antiblocking agent, flame retarder, cross-linking agent, curing agent, foaming agent, crystal nucleating agent, antifogging agent, biodegradation additive, silane coupling agent, and oxygen absorber, which may be used alone or in combination.

The resin composition of the present disclosure can be prepared, for example, by mixing the hydrophilic resin, the metal compound, and some other optional ingredients.

Alternatively, the resin composition of the present disclosure may be prepared, for example, by blending the hydrophilic resin, the metal-containing material compound, and the solvent, and heating and stirring the resulting mixture. In this method, the metal-containing material compound reacts in the solvent to be changed in structure, whereby the metal compound is generated.

The amount of the metal-containing material compound is typically 0.01 to 20 parts by weight, preferably 0.01 to 10 parts by weight, more preferably 0.1 to 8 parts by weight, particularly preferably 0.2 to 5 parts by weight, on a metal basis based on 100 parts by weight of the hydrophilic resin.

The solvent is not particularly limited, as long as the hydrophilic resin can be dissolved therein. Water is typically used as the solvent. In order to reduce a period required for drying a film formed from the resin composition, a C1 to C5 lower alcohol such as methanol, ethanol, propanol, n-butanol or isopropanol may be used, as long as the hydrophilic resin can be dissolved therein. The amount of the solvent is typically 100 to 9,900 parts by weight, preferably 400 to 1,900 parts by weight, based on 100 parts by weight of the hydrophilic resin.

The blending order of the hydrophilic resin, the metal-containing material compound, and the solvent is not particularly limited, but these ingredients may be blended simultaneously or sequentially. From the viewpoint of the reactivity, it is particularly preferred to blend the hydrophilic resin and the metal-containing material compound in the solvent.

The heating temperature is typically 20° C. to 100° C., preferably 40° C. to 95° C., particularly preferably 80° C. to 95° C. If the heating temperature is excessively low, the hydrophilic resin tends to be insufficiently dissolved in the solvent. If the heating temperature is excessively high, the metal-containing material compound tends to be decomposed.

The reaction period is typically 0.5 to 5 hours, preferably 1 to 4 hours, particularly preferably 2 to 3 hours. If the reaction period is excessively short, the reaction tends to insufficiently proceed. If the reaction period is excessively long, it will be impossible to improve the reaction yield, resulting in poorer economy.

The pressure during the heating may be an ordinary pressure.

<Resin Composition>

The resin composition according to one embodiment of the present disclosure contains the hydrophilic resin and the metal compound, and has an X-ray diffraction peak at $2\theta = 2$ to $15°$ in an X-ray diffraction pattern as measured by the wide angle X-ray diffraction using CuKα radiation. The peak appearing at $2\theta = 2$ to $15°$ on a lower angle side is attributable to the metal compound produced from the added metal-containing material compound.

In the embodiment of the present disclosure, the resin composition more preferably has the major peak at $2\theta = 2$ to $9°$, particularly preferably at $2\theta = 3$ to $8°$, in the X-ray diffraction pattern as measured by the wide angle X-ray diffraction using CuKα radiation for the excellent gas barrier property, particularly for the excellent oxygen barrier property, in the high humidity environment.

The major peak appearing at $2\theta=2$ to $15°$ in the X-ray diffraction pattern as measured by the wide angle X-ray diffraction using CuKα radiation is preferably attributable to the metal compound satisfying the above general formula (1).

The wide angle X-ray diffraction is performed under the following conditions:

[Measurement Conditions]

Apparatus: D8 DISCOVER (available from Bruker Japan Co., Ltd.)

Detector: Two-dimensional detector VANTEC-500 (available from Bruker Japan Co., Ltd.)

Voltage: 50 kV

Electric current: 100 mA

Camera length: 100 mm

Measurement method: Reflection method

Integration period: 30 minutes

Wavelength: CuKα radiation (with Kα1 and Kα2 not separated)

Detector position: $2\theta=10°$

X-ray incident angle: $\theta=0.3°$

Conditions for one-dimensional integration in $2\theta$ direction: $2\theta=0$ to $35°$, Azimuthal angle (chi)$=-95$ to $-85°$ One-dimensional integration in azimuthal direction: Azimuthal angle (chi)$=-180$ to $0°$ The one-dimensional integration in the azimuthal direction is performed with a $1.0°$ range, so that a peak having the highest diffraction intensity appears at $2\theta=2$ to $15°$. At this time, where a peak is observed in an azimuthal angle range of $-180$ to $0°$, it is determined that a diffraction peak is observed at $2\theta=2$ to $15°$. Where a diffraction peak is observed at $2\theta=6.8°$, for example, the one-dimensional integration in the azimuthal direction is performed for $2\theta=6.0$ to $7.0°$. At this time, if a peak is observed in an azimuthal angle range of $-180$ to $0°$, it may be determined that a diffraction peak is observed at $2\theta=2$ to $15°$.

A film formed from the resin composition to be described later may be used as it is as a specimen for the wide angle X-ray diffraction. The resin composition film is often laminated as a resin composition layer on a base. If the resin composition layer can be separated from the base, the wide angle X-ray diffraction may be performed on the separated resin composition layer. If the resin composition layer cannot be separated from the base, the wide angle X-ray diffraction may be performed on the resin composition layer laminated on the base. For the wide angle X-ray diffraction, the thickness of the resin composition layer (film) is preferably not less than 30 μm. If the resin composition film has an insufficient thickness, a plurality of such resin composition films may be stacked to be formed into a laminate.

The resin composition according to the embodiment of the present disclosure contains the hydrophilic resin and the metal compound satisfying the following general formula (1):

$$M_a(OH)_bA^{n-}{}_{(2a-b)/n} \tag{1}$$

wherein M is the metal species, A is the anionic ligand having a valence of n- and excluding a hydroxy ligand and O (oxo ligand), n is an integer not less than 1, and a and b are numbers greater than zero and satisfy an expression a/b=0.1 to 10.

The polarity of the hydrophilic resin is increased by the interaction between the hydrophilic resin and the lamellar structure of the metal compound satisfying the above general formula (1). This supposedly provides an effect of ensuring the excellent gas barrier property, particularly the excellent oxygen barrier property, in the high humidity environment.

In the resin composition according to the embodiment of the present disclosure, a difference between the second virial coefficient ($A_2$) of the resin composition and the second virial coefficient ($A_{2,0}$) of the hydrophilic resin in the resin composition as determined through static light scattering measurement preferably satisfies the following expression (2):

$$\Delta A_2 = A_2 - A_{2,0} > 0 \tag{2}$$

The difference ($A_2 - A_{2,0}$) between the second virial coefficient ($A_2$) of the resin composition and the second virial coefficient ($A_{2,0}$) of the hydrophilic resin in the resin composition is preferably greater than zero, more preferably $A_2 - A_{2,0} > 0.00005$, particularly preferably $A_2 - A_{2,0} > 0.0001$, especially preferably $A_2 - A_{2,0} > 0.0005$. The upper limit of the difference ($A_2 - A_{2,0}$) is typically 0.01, preferably 0.1. If the difference ($A_2 - A_{2,0}$) is not greater than zero, the gas barrier property, particularly the oxygen barrier property, in the high humidity environment tends to be poorer.

The second virial coefficients $A_2$, $A_{2,0}$ are determined in the following manner.

Five measurement solutions are prepared as having different solid concentrations within a range of 0.1 to 1 mg/mL by dissolving the resin composition in hexafluoroisopropanol as a solvent, and the static light scattering measurement is performed on the measurement solutions at a temperature of $25°$ C. Then, the second virial coefficient $A_2$ and the weight average molecular weight Mwb of the resin composition are determined based on the resulting Zimm plot.

Further, the second virial coefficient $A_x$ and the weight average molecular weight $Mw_a$ of the hydrophilic resin are determined in the same manner.

The hydrophilic resin is the same hydrophilic resin as contained in the resin composition, i.e., the hydrophilic resin yet to be blended with the metal compound in the resin composition.

The resin composition of the present disclosure contains the hydrophilic resin and the metal compound. Therefore, the weight average molecular weight of the hydrophilic resin in the resin composition is different from the apparent weight average molecular weight ($Mw_a$) of the hydrophilic resin. Accordingly, the second virial coefficient $A_x$ determined through the static light scattering measurement of the hydrophilic resin cannot be employed as the second virial coefficient $A_{2,0}$ of the hydrophilic resin in the resin composition. Therefore, the second virial coefficient $A_{2,0}$ of the hydrophilic resin in the resin composition is determined in the following manner.

1) A constant q is determined from the following expression (3):

$$q = A_x / Mw_a{}^v \tag{3}$$

$A_x$: The second virial coefficient determined through the static light scattering measurement of the hydrophilic resin.

$Mw_a$: The weight average molecular weight determined through the static light scattering measurement of the hydrophilic resin.

v: $-0.25$

Here, v in a good solvent is generally $-0.25$ and, therefore, $v=-0.25$ is employed for the calculation.

2) The second virial coefficient $A_{2,0}$ of the hydrophilic resin is determined from the following expression (4) by using the constant q thus obtained and the weight average molecular weight $Mw_b$ determined through the static light scattering measurement of the resin composition. In the following expression (4), $v=-0.25$ is used as in the above expression (3).

$$A_{2,0}=q \times Mw_b{}^v \qquad (4)$$

<Film Containing Resin Composition>

The film containing the resin composition of the present disclosure is formed from a composition containing the resin composition described above, preferably from the resin composition.

Exemplary film forming methods include a method using a solution (coating liquid) of the composition containing the resin composition of the present disclosure, and a method in which pellets of the composition containing the resin composition of the present disclosure are melt-formed by means of an extruder. Particularly, the method using the solution (coating liquid) of the composition containing the resin composition is preferred. Where the coating liquid is to be used, the coating liquid typically has a solid concentration of 0.5 to 30 wt. %, preferably 5 to 20 wt. %.

Exemplary coating liquid preparation methods include a method in which all the ingredients are simultaneously fed to and mixed together in a solvent, and a method in which a solution is prepared by dissolving some of the ingredients in a solvent, and the other ingredients are added to and mixed with the solution. Particularly, a method in which a solution is prepared by dissolving the hydrophilic resin in a solvent, and the other ingredients are added to and mixed with the solution is preferred for working efficiency.

In the metal compound preparation methods described above, the hydrophilic resin is preferably dissolved in the solvent during the reaction of the metal-containing material compound. For the working efficiency, the hydrophilic resin is preferably dissolved in the solvent in the metal compound preparation method (II).

Usable examples of the solvent include those described for the preparation of the metal compound.

Specific examples of the film forming methods include known methods such as melt extrusion method, endless belt method, drum method, coating method, and other casting methods. Of these, the casting methods are preferred, and the coating method is particularly preferred.

Examples of the coating method include known methods such as bar coater method, roll coating method, die coating method, Gravure coating method, comma coating method, and screen printing method.

After the coating, the resulting coating film is dried, for example, at 60° C. to 105° C. for 0.5 to 10 minutes with heating. Thus, the film of the resin composition can be produced. As required, the film may be stretched by uniaxial stretching method or biaxial stretching method.

The film may be provided in the form of a single layer structure film or may be provided in the form of a multilayer structure. The multilayer structure preferably includes at least one layer of the film. The multilayer structure may include a plurality of such films laminated together, or may include such a film laminated on a base film of some other base resin.

The film typically has a thickness of 1 to 200 μm, preferably 1 to 100 μm, particularly preferably 1 to 50 μm. Where the formed film is provided in the form of the multilayer structure, the film thickness is the total thickness of all the films formed of the resin composition.

Examples of the base resin include: (unmodified) poly-olefin resins including polyethylene resins such as linear low-density polyethylenes, low-density polyethylenes, verylow-density polyethylenes, medium-density polyethylenes, high-density polyethylenes, ethylene-propylene (block and random) copolymers, and ethylene-α-olefin (C4 to C20 α-olefin) copolymers, polypropylene resins such as poly-propylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated car-boxylic acid ester; and ionomers, ethylene-vinyl acetate copolymers, ethylene-acrylic acid copolymers, ethylene-acrylate copolymers, polyester resins, polyamide resins (in-cluding polyamide copolymers), polyvinyl chlorides, poly-vinylidene chlorides, acrylic resins, polystyrenes, vinyl ester resins, polyester elastomers, polyurethane elastomers, poly-styrene elastomers, halogenated polyolefins such as chlori-nated polyethylenes and chlorinated polypropylenes, and aromatic and aliphatic polyketones. These may be used alone or in combination. A base film formed of any of these base resins may be subjected to a surface treatment such as corona treatment.

The film containing the resin composition of the present disclosure has an excellent gas barrier property in the high humidity environment. The film is preferably allowed to stand still in the higher humidity environment, because the film can be imparted with a more excellent gas barrier property, particularly a more excellent oxygen barrier prop-erty, in the high humidity environment. There is no clear principle for this effect, but it is supposed that, by allowing the film to stand still in the higher humidity environment, the molecules of the hydrophilic resin are plasticized, and the metal compound dispersed in the film interacts with the hydrophilic resin or is locally present in the surface of the film.

In the present disclosure, the higher humidity environ-ment means an environment at 20±5° C. at 90±10% RH.

The period during which the film is allowed to stand still is typically not shorter than 70 hours, preferably not shorter than 100 hours, more preferably not shorter than 150 hours. The upper limit of the stand-still period is typically 1,000 hours.

The film containing the resin composition of the present disclosure preferably has an oxygen permeability of not greater than 80 cc·3 μm/m²·day·atm, more preferably not greater than 70 cc·3 μm/m²·day·atm, still more preferably not greater than 55 cc·3 μm/m²·day·atm, more preferably not greater than 40 cc·3 μm/m²·day·atm, still more preferably not greater than 35 cc·3 μm/m²·day·atm, more preferably not greater than 30 cc·3 μm/m²·day·atm, still more preferably not greater than 25 cc·3 μm/m²·day·atm, more preferably not greater than 20 cc·3 μm/m²·day·atm, particularly preferably not greater than 10 cc·3 μm/m²·day·atm, as measured in an environment at 23° C. at 80% RH. The lower limit of the oxygen permeability is typically 0 cc·3 μm/m²·day·atm. The oxygen permeability can be measured by means of an oxygen permeability measurement apparatus.

The film containing the resin composition of the present disclosure is highly transparent, and the transparency of the film is significantly excellent as compared with a film containing an inorganic lamellar compound or a filler. Spe-cifically, the film containing the resin composition of the present disclosure preferably has a haze of not greater than 1%, more preferably not greater than 0.6%, still more preferably not greater than 0.3%, particularly preferably not greater than 0.2%. The haze is a HAZE value measured in conformity with JIS K7361-1. For example, ten test samples each having a size of 50 mm×50 mm are cut out of the film, and the haze values of the ten test samples are measured by a haze meter (NDH-4000 available from Nippon Denshoku Industries Co., Ltd.) and averaged. The average haze value is employed as the haze (%).

The resin composition of the present disclosure and the film containing the resin composition are useful for packaging materials, and can be advantageously used for packaging materials, particularly, for foods, pharmaceutical products, and the like.

EXAMPLES

The embodiments of the present disclosure will hereinafter be described more specifically by way of examples thereof. However, it should be understood that the present disclosure be not limited to the examples within the scope of the present disclosure. In the following examples, "parts" is based on weight.

First Examples

Prior to implementation of First Examples, the following hydrophilic resin was prepared.

[Hydrophilic Resin]

PVA (1): Unmodified PVA resin having an average polymerization degree of 300 and an average saponification degree of 99 mol %

Example 1-1

First, 100 parts of the PVA (1) and 0.3 parts of zinc acetate on a metal basis were added to 900 parts of water, and dissolved in the water with heating to 90° C. with stirring. After the resulting mixture was maintained at 90° C. and stirred for 3 hours, the mixture was cooled to a room temperature (23° C.). Thus, a solution containing the hydrophilic resin and the metal compound was prepared.

The solution thus prepared was applied on a corona-treated PET film having a thickness of 38 μm by means of a bar coater, and dried at 120° C. for 5 minutes in a hot air dryer. Then, a coating film obtained after the drying was allowed to stand still in an environment at 23° C. at 80% RH for 72 hours. Thus, a resin composition film (having a thickness of 3 μm) of Example 1-1 was produced.

The resin composition film thus produced was separated from the PET film, and a plurality of such resin composition films were stacked to a thickness of not less than 30 μm. Thus, a sample was prepared.

The sample was analyzed by performing X-ray diffraction measurement under the following conditions. The results are shown below in Table 1.

[Measurement Conditions]

Apparatus: D8 DISCOVER (available from Bruker Japan Co., Ltd.)

Detector: Two-dimensional detector VANTEC-500 (available from Bruker Japan Co., Ltd.)

Voltage: 50 kV

Electric current: 100 mA

Camera length: 100 mm

Measurement method: Reflection method

Integration period: 30 minutes

Wavelength: CuKα radiation (with Kα1 and Kα2 not separated)

Detector position: 2θ=10°

X-ray incident angle: θ=0.3°

Conditions for one-dimensional integration in 2θ direction: 2θ=1 to 35°, Chi=−95 to −85°

One-dimensional integration in azimuthal direction: 2θ=3.5 to 4.5°, Azimuthal angle (chi)=−180 to 0°

Where a peak was observed at 2θ=3 to 10° in the one-dimensional integration in the 2θ direction, the one-dimensional integration in the azimuthal direction was not performed. Where no peak was observed in the one-dimensional integration in the 2θ direction, a diffraction pattern in an azimuthal angle range of −180 to 0° was azimuthally integrated into a one-dimensional diffraction pattern in a range of 2θ=3.5 to 4.5° for confirmation of the azimuthal dependence of the diffraction intensity. At this time, where a diffraction peak was observed at an azimuthal angle of −90°, it was determined that a complex was present in the resin composition.

[Oxygen Barrier Property]

The oxygen permeability of the resulting resin composition film was measured at 23° C. at 80% RH by means of an oxygen permeability measurement apparatus (OX-TRAN100A available from MOCON Corporation). The results are shown below in Table 1.

Example 1-2

A resin composition film of Example 1-2 was produced in substantially the same manner as in Example 1-1, except that zinc acetate was added in an amount of 1 part on a metal basis. Thereafter, the resin composition film thus produced was analyzed by the X-ray diffraction in the same manner as in Example 1-1. Further, the resin composition film was evaluated for oxygen barrier property in the same manner as in Example 1-1. The results are shown below in Table 1.

Example 1-3

A resin composition film of Example 1-3 was produced in substantially the same manner as in Example 1-1, except that zinc acetate was added in an amount of 5 parts on a metal basis. Thereafter, the resin composition film thus produced was analyzed by the X-ray diffraction in the same manner as in Example 1-1. Further, the resin composition film was evaluated for oxygen barrier property in the same manner as in Example 1-1. The results are shown below in Table 1.

Comparative Example 1-1

A hydrophilic resin film of Comparative Example 1-1 was produced in substantially the same manner as in Example 1-1, except that zinc acetate was not added. Thereafter, the hydrophilic resin film thus produced was analyzed by the X-ray diffraction in the same manner as in Example 1-1. Further, the hydrophilic resin film was evaluated for oxygen barrier property in the same manner as in Example 1-1. The results are shown below in Table 1.

Comparative Example 1-2

A resin composition film of Comparative Example 1-2 was produced in substantially the same manner as in Example 1-1, except that zinc oxide was added in an amount of 1 part on a metal basis instead of zinc acetate. Thereafter, the resin composition film thus produced was analyzed by the X-ray diffraction in the same manner as in Example 1-1. Further, the resin composition film was evaluated for oxygen barrier property in the same manner as in Example 1-1. The results are shown below in Table 1.

Comparative Example 1-3

A resin composition film of Comparative Example 1-3 was produced in substantially the same manner as in Example 1-1, except that zinc chloride was added in an amount of 1 part on a metal basis instead of zinc acetate. Thereafter, the resin composition film thus produced was analyzed by the X-ray diffraction in the same manner as in Example 1-1. Further, the resin composition film was evaluated for oxygen barrier property in the same manner as in Example 1-1. The results are shown below in Table 1.

TABLE 1

| | Example 1-1 | Example 1-2 | Example 1-3 | Comparative Example 1-1 | Comparative Example 1-2 | Comparative Example 1-3 |
|---|---|---|---|---|---|---|
| Hydrophilic resin (parts) | | | PVA (1) 100 | | | |
| | | | Metal compound | | | |
| Metal-containing material compound | Zinc acetate | Zinc acetate | Zinc acetate | — | Zinc oxide | Zinc chloride |
| Added amount (parts)[*1] on metal basis | 0.3 | 1 | 5 | — | 1 | 1 |
| 2θ (°) | 6.2 | 6.2 | 6.2 | —[*2] | —[*2] | —[*2] |
| Oxygen barrier property (cc · 3 µm/m² · day · atm) | 3 | 5 | 6 | 100 | 103 | 298 |

[*1]Added amount based on 100 parts by weight of hydrophilic resin.
[*2]No peak was detected.

As indicated above in Table 1, the resin composition films of Examples 1-1 to 1-3 each containing the hydrophilic resin and the metal compound and having an X-ray diffraction peak on a smaller angle side (at 2θ=2 to 15° are excellent in oxygen barrier property in the higher humidity environment.

In contrast, the films of Comparative Examples 1-1 to 1-3 having no X-ray diffraction peak on the smaller angle side are poorer in oxygen barrier property.

Second Examples

Prior to implementation of Second Examples, the following hydrophilic resin was prepared.

[Hydrophilic Resin]

[PVA Resin]

PVA (2): Unmodified PVA resin having an average polymerization degree of 300 and an average saponification degree of 99 mol %

A metal compound was synthesized in the following manner.

<Synthesis of Layered Basic Zinc Compound>

A layered basic zinc compound was synthesized by a method described in Inorg. Chem. 2013, 52, 95-102.

Specifically, 900 parts of a 1.5 mol/L sodium hydroxide aqueous solution was stirred at 27° C., and 900 parts of a 1.5 mol/L aqueous solution of zinc acetate dihydrate (available from Fujifilm Wako Pure Chemical Corporation) was added to the sodium hydroxide aqueous solution. Then, a reaction was allowed to proceed at 27° C. for two hours with stirring. After the reaction, a deposited white precipitate was filtered by a vacuum filtration method. Thereafter, the resulting white solid substance was stirred in 750 parts of water, and filtered for washing thereof. This washing operation was performed a total of three times by changing water. The white solid substance finally filtered out was dried at 60° C.

at an ordinary pressure over night (for ten hours), whereby a layered basic zinc compound was prepared.

<Identification of Synthesized Layered Basic Zinc Compound>

The resulting solid substance was identified as the layered basic zinc compound by the solid-state NMR and the wide angle X-ray diffraction.

[Solid-State NMR ([13]C-CP/MS) Measurement]

A 4-mm ϕ zirconia rotor was filled with the layered basic zinc compound, and tightly capped with a polyethylene drive chip, whereby a measurement sample was prepared. The measurement sample was analyzed with a CP/MAS probe by means of a solid-state NMR apparatus (AVANCE III 400WB ($^1$H at 400 MHz and $^{13}$C at 100 MHz) available from Bruker Japan Co., Ltd.)

After the rotor was rotated at 5,000 Hz, the NMR analysis was performed with a 90-degree pulse width of 45 µs, a contact time of 2 ms, a cumulative number of 485, a sampling period of 50 ms, and a delay period of 5 sec.

[Wide Angle X-Ray Diffraction (XRD) Measurement]

The layered basic zinc compound was analyzed by the wide angle X-ray diffraction (XRD) measurement under the following conditions.

[Measurement Conditions]

Apparatus: D8 DISCOVER (available from Bruker Japan Co., Ltd.)

Voltage: 50 kV

Electric current: 100 mA

Camera length: 150 mm

Measurement method: Reflection method

Integration period: 20 minutes

As a result of the measurement, major peaks were detected at 2θ=6.8°, 13.5°, and 20.2°.

Based on the measurement results of the solid-state NMR and the wide angle X-ray diffraction, the layered basic zinc compound was identified as $Zn_5(OH)_8(CH_3CO_2)_2·2H_2O$ with reference to Inorg. Chem. 2013, 52, 95-102.

Based on the diffraction position of a highest-intensity peak observed at 2θ=6.8° when the layered basic zinc compound $(Zn_5(OH)_8(CH_3CO_2)_2·2H_2O)$ was analyzed by the wide angle X-ray diffraction, the interlayer distance of the layered basic zinc compound was calculated from the Bragg equation. As a result, it was confirmed that the layered basic zinc compound $(Zn_5(OH)_8(CH_3CO_2)_2·2H_2O)$ had an interlayer distance of 1.3 nm.

Example 2-1

First, 100 parts of the PVA (2) was added to 900 parts of water, and completely dissolved in the water with heating to 90° C. with stirring for one hour. The resulting solution was cooled to 60° C., and then the layered basic zinc compound prepared in the aforementioned manner was added in an amount of 0.5 parts on a metal basis based on 100 parts of the PVA (2) to the solution. The resulting mixture was stirred at 60° C. for one hour, whereby a resin composition (coating liquid) was prepared. The coating liquid thus prepared was applied on a corona-treated surface of a corona-treated PET substrate having a thickness of 38 μm with the use of a wire bar #18, and then dried at 80° C. for five minutes. Thus, a double layer film including a 3-μm thick film layer of the resin composition laminated on the PET substrate was produced. The resulting film was allowed to keep still under a humidity condition at 23° C. at 80% RH for 200 hours. Thus, a film of Example 2-1 was produced.

Example 2-2

A film was produced in substantially the same manner as in Example 2-1, except that the layered basic zinc compound was added in an amount of 1 part on a metal basis based on 100 parts of the PVA (2). The resulting film was allowed to keep still under the same humidity condition as in Example 2-1, whereby a film of Example 2-2 was produced.

Example 2-3

A film was produced in substantially the same manner as in Example 2-1, except that the layered basic zinc compound was added in an amount of 3 parts on a metal basis based on 100 parts of the PVA (2). The resulting film was allowed to keep still under the same humidity condition as in Example 2-1, whereby a film of Example 2-3 was produced.

Example 2-4

A film was produced in substantially the same manner as in Example 2-1, except that the layered basic zinc compound was added in an amount of 5 parts on a metal basis based on 100 parts of the PVA (2). The resulting film was allowed to keep still under the same humidity condition as in Example 2-1, whereby a film of Example 2-4 was produced.

Comparative Example 2-1

A film was produced in substantially the same manner as in Example 2-1, except that the layered basic zinc compound was not added. The resulting film was allowed to keep still under the same humidity condition as in Example 2-1, whereby a film of Comparative Example 2-1 was produced.

Comparative Example 2-2

A film was produced in substantially the same manner as in Example 2-1, except that zinc oxide (available from Fujifilm Wako Pure Chemical Corporation) was added in an amount of 1 part on a metal basis based on 100 parts of the PVA (2) instead of the layered basic zinc compound. The resulting film was allowed to keep still under the same humidity condition as in Example 2-1, whereby a film of Comparative Example 2-2 was produced.

Comparative Example 2-3

A film was produced in substantially the same manner as in Example 2-1, except that zinc chloride (available from Fujifilm Wako Pure Chemical Corporation) was added in an amount of 1 part on a metal basis based on 100 parts of the PVA (2) instead of the layered basic zinc compound. The resulting film was allowed to keep still under the same humidity condition as in Example 2-1, whereby a film of Comparative Example 2-3 was produced.

The films of Examples 2-1 to 2-4, and Comparative Examples 2-1 to 2-3 produced in the aforementioned manner were each analyzed by performing the wide angle X-ray diffraction measurement under the following conditions and by measuring the oxygen permeability (oxygen barrier property). The results are shown below in Table 2.

[Wide Angle X-Ray Diffraction (XRD) Measurement of Films]

Out of each of the films produced in the aforementioned manner, the resin composition film was separated from the PET film, and a plurality of such resin composition films were stacked to a thickness of not less than 30 μm. Thus, a sample was prepared.

The sample was analyzed by performing the wide angle X-ray diffraction measurement under the following conditions:

[Measurement Conditions]

Apparatus: D8 DISCOVER (available from Bruker Japan Co., Ltd.)

Detector: Two-dimensional detector VANTEC-500 (available from Bruker Japan Co., Ltd.)

Voltage: 50 kV

Electric current: 100 mA

Camera length: 100 mm

Measurement method: Reflection method

Integration period: 30 minutes

Wavelength: CuKα radiation (with Kα1 and Kα2 not separated)

Detector position: $2\theta=10°$

X-ray incident angle: $\theta=0.3°$

Conditions for one-dimensional integration in $2\theta$ direction: $2\theta=0$ to 35°, Azimuthal angle (chi)=−95 to −85°

One-dimensional integration in azimuthal direction: $2\theta=6.0$ to 7.0°, Azimuthal angle (chi)=−180 to 0°

After the X-ray diffraction measurement, the resulting diffraction pattern in an azimuthal angle range of −180 to 0° was azimuthally integrated into a one-dimensional diffraction pattern in a range of $2\theta=6.0$ to 7.0° for confirmation of the azimuthal dependence of the diffraction intensity. At this time, where a diffraction peak was observed at an azimuthal angle of −90°, it was determined that the resin composition had a diffraction peak at $2\theta=6.0$ to 7.0°.

[Oxygen Barrier Property]

The oxygen permeability of the resulting resin composition film was measured at 23° C. at 80% RH by means of an oxygen permeability measurement apparatus (OX-TRAN100A available from MOCON Corporation).

TABLE 2

| | Example 2-1 | Example 2-2 | Example 2-3 | Example 2-4 | Comparative Example 2-1 | Comparative Example 2-2 | Comparative Example 2-3 |
|---|---|---|---|---|---|---|---|
| Hydrophilic resin (parts) | | | | PVA (2) 100 | | | |
| | | | | Metal Composition | | | |
| Type | $Zn_5(OH)_8(CH_3CO_2)_2 \cdot 2H_2O$ | | | | — | ZnO | $ZnCl_2$ |
| Amount on metal basis[*1] (parts) | 0.5 | 1 | 3 | 5 | — | 1 | 1 |

TABLE 2-continued

| | Example 2-1 | Example 2-2 | Example 2-3 | Example 2-4 | Comparative Example 2-1 | Comparative Example 2-2 | Comparative Example 2-3 |
|---|---|---|---|---|---|---|---|
| X-ra y diffraction 2θ (°) | 6.2 | 6.2 | 6.2 | 6.2 | —*2 | —*2 | —*2 |
| Oxygen barrier property (cc · 3 μm/m² · day · atm) | 19 | 12 | 9 | 39 | 100 | 103 | 298 |

*1Amount based on 100 parts by weight of hydrophilic resin.
*2No peak was detected.

As indicated above in Table 2, the films of Examples 2-1 to 2-4 each containing the hydrophilic resin and the metal compound satisfying the general formula (1) are excellent in oxygen barrier property in the high humidity environment.

In contrast, the films of Comparative Examples 2-1 to 2-3 not containing the metal compound satisfying the general formula (1) are poorer in oxygen barrier property.

While specific forms of the embodiment of the present disclosure have been shown in the aforementioned examples, the examples are merely illustrative but not limitative. It is contemplated that various modifications apparent to those skilled in the art could be made within the scope of the disclosure.

The resin compositions of the present disclosure are excellent in gas barrier property, particularly in oxygen barrier property, in the high humidity environment. Therefore, the resin compositions of the present disclosure are useful for packaging materials, and can be advantageously used for packaging materials, particularly, for foods, pharmaceutical products, and the like.

The invention claimed is:

1. A resin composition comprising:
a hydrophilic resin; and
a metal compound;
wherein the hydrophilic resin excludes an ethylene-vinyl alcohol copolymer resin having an ethylene content of 20 to 60 mol %;
wherein the metal compound is present in an amount of 0.01 to 20 parts by weight on a metal basis based on 100 parts by weight of the hydrophilic resin;
wherein a metal species of the metal compound is at least one selected from the group consisting of Zn, Co, and Ni;
wherein the resin composition having an X-ray diffraction peak at 2θ=2 to 9° in an X-ray diffraction pattern as measured by wide angle X-ray diffraction using CuKα radiation; and wherein a film containing the resin composition has an oxygen permeability of not greater than 80 cc·3 μm/m²·day·atm at 23° C. at 80% RH.

2. A film comprising the resin composition according to claim 1.

3. A multilayer structure comprising a plurality of layers, at least one of which is the film according to claim 2.

4. A resin composition comprising:
a hydrophilic resin; and
a metal compound;
wherein the hydrophilic resin excludes an ethylene-vinyl alcohol copolymer resin having an ethylene content of 20 to 60 mol %;
wherein the metal compound satisfies the following general formula (1):

$$M_a(OH)_b A^{n-}{}_{(2a-b)/n} \tag{1}$$

wherein M is a metal species, A is an anionic ligand having a valence of n− and excluding a hydroxy ligand and O (oxo ligand), n is an integer not less than 1, and a and b are numbers greater than zero and satisfy an expression a/b=0.1 to 10, and
wherein a film containing the resin composition has an oxygen permeability of not greater than 80 cc·3 μm/m²·day·atm at 23° C. at 80% RH.

5. The resin composition according to claim 4, wherein the metal compound is present in an amount of 0.01 to 20 wt. % on a metal basis based on a weight of the resin composition.

6. A film comprising the resin composition according to claim 4.

7. A multilayer structure comprising a plurality of layers, at least one of which is the film according to claim 6.

* * * * *